Jan. 18, 1949. J. F. SCHMERHEIM 2,459,543
BASE FOR AN ELECTRIC DEVICE
Filed June 14, 1947 2 Sheets-Sheet 1
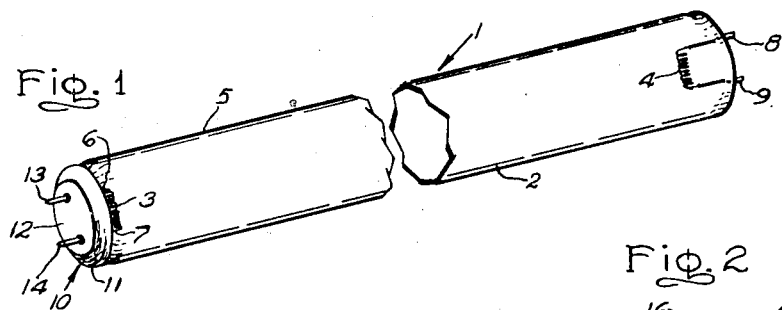
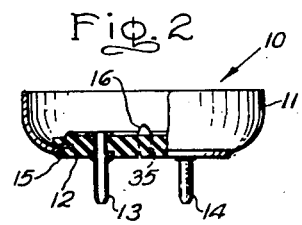
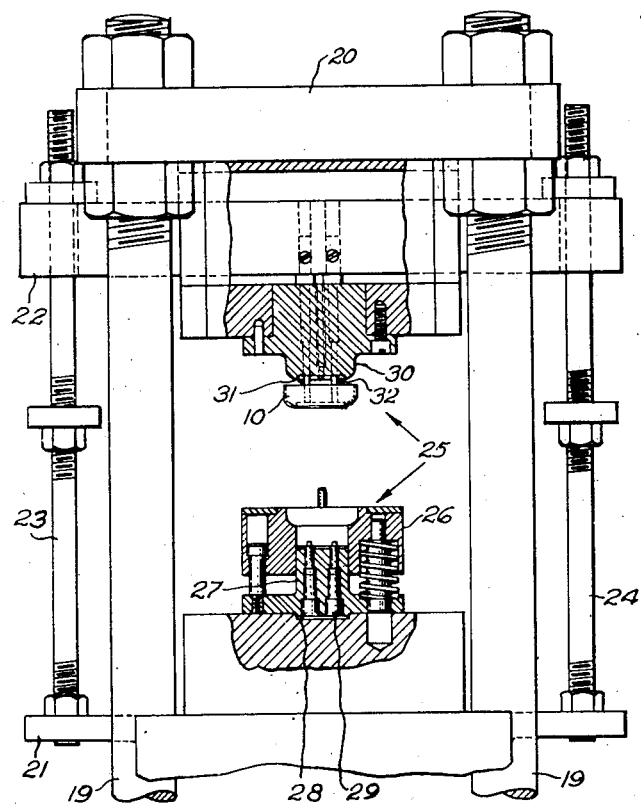
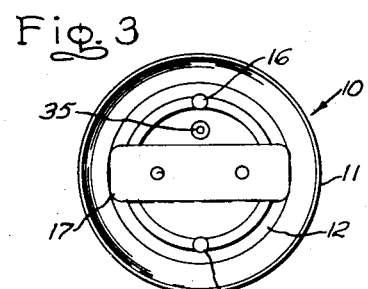
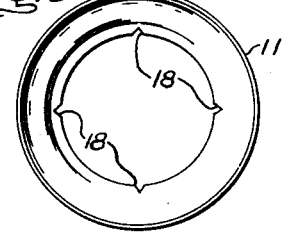
Inventor:
John F. Schmerheim,
by Vernet C. Kauffman
His Attorney.

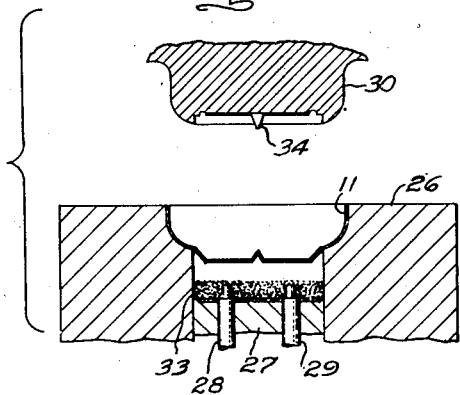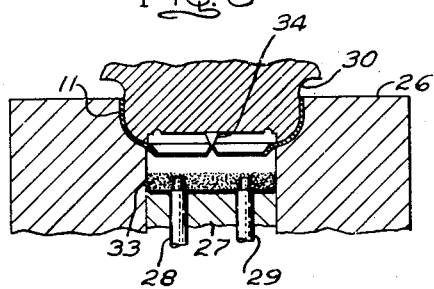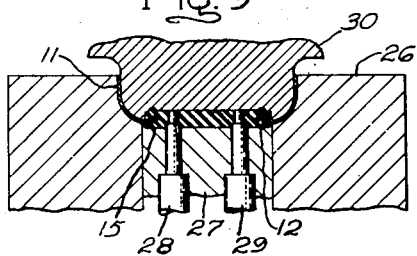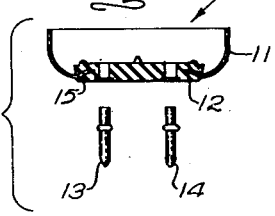

Patented Jan. 18, 1949

2,459,543

UNITED STATES PATENT OFFICE 2,459,543

BASE FOR AN ELECTRIC DEVICE

John F. Schmerheim, South Euclid, Ohio, assignor to General Electric Company, a corporation of New York Application June 14, 1947, Serial No. 754,731

2 Claims. (Cl. 176—32)

This invention relates to electric devices and more particularly to base structure therefor.

Bases now in wide use with most electric devices are constructed from plastics or metals or a combination thereof. These prior art arrangements are not entirely satisfactory. The plastic base lacks the degree of flexibility and strength needed for lamp manufacturing methods used and also for the handling requirements of the trade. The metallic base requires separate insulating parts and extra assembly costs. The combination plastic and metallic bases rely on mechanical or friction connections for securing together the respective parts. Therefore, a decided need has presented itself for a base which will be strong in strength, flexible in handling, and economical in assembly and cost.

An object of my invention is to provide a new and improved base for an electric device.

Another object of my invention is to provide a new and improved base for an electric device comprising a shell provided with a reentrant flange defining an aperture, and a disc of insulating material disposed within and bridging the aperture with the edge portion of the flange embedded in the peripheral edge of the disc.

A further object of my invention is to provide new and improved methods for molding a plastic disc into a metallic shell.

Further features and advantages of my invention will appear from the following detailed description of species thereof. For a better understanding of my invention reference may be had to the following description taken in connection with the accompanying drawings and its scope will be pointed out in the appended claims.

Figure 1 is a side elevation of an electric discharge device incorporating my invention. Figure 2 is a perspective view partly in section of the base of the electric discharge device shown in Figure 1. Figure 3 is a top view of the base shown in Figure 2. Figure 4 illustrates the metallic shell used as part of the base of Figure 2. Figure 5 is a bottom view of the shell illustrated in Figure 4. Figure 6 is a side elevation partly in section of an apparatus for molding a plastic disc into a metallic shell in forming the base illustrated in Figure 2. Figures 7, 8, 9, and 10 illustrate steps in the method of molding a plastic disc into a metallic shell in the construction of the base illustrated in Figure 2.

Referring to Fig. 1, I have there illustrated one embodiment of my invention as applied to an electric discharge device 1. The electric discharge device 1, such as a fluorescent lamp therein illustrated, comprises an elongated tubular or cylindrical envelope 2 having sealed into the ends thereof filamentary electrodes 3 and 4, each illustrated as comprising a coil, preferably in the form of a coiled coil of tungsten wire activated with oxides of alkalin earth metals, such as a mixture of barium and strontium oxides. The envelope 2 contains a gaseous atmosphere such as a rare gas like neon, argon or mixtures thereof at a pressure of a few millimeters and a small quantity of mercury which, during the operation of the lamps, has a low pressure of the order of 10 microns. The device 1 may be a low pressure positive column lamp of a fluorescent type provided with a suitable phosphor or fluorescent coating. This fluorescent coating upon excitation by the radiation produced by an electric discharge between the electrodes, transforms a shorter wave radiation due to the discharge into longer wave radiation such as radiation within the visible range. For ease of starting a stripe or strip 5 of conductive material which, for example, may be a metallic paint or graphite mixed with potassium silicate, may be applied to the surface of device 1. The starting strip 5 may be connected to one or both of the electrodes. Lead-in wires 6, 7 and 8, 9 serve as supports for electrodes 3 and 4, respectively, and permit electrical contact to the electrode structure from a source of current. A terminal base 10 incorporating my invention, comprising a cup-shaped metallic cylindrical shell portion 11 having molded thereinto a plastic disc 12 which in turn supports terminal contacts 13 and 14 forms a rigid structure for supporting and connecting the lead-in wires to a source of current.

In accordance with my invention the insulating or plastic disc 12 is molded or formed integral with the metallic shell 11. As indicated in Fig. 2, shell 11 is provided with an inturned or reentrant flange 15 the end portion of which defines an aperture in the bottom wall thereof to provide at the margin of the aperture an outwardly projecting frusto-conical flange portion. Disc 12 is deposed within and bridges the aperture and embeds the end portions of flange 15 within its peripheral edge. A pair of nipples 16 are disposed at or near the inner side of the peripheral edge of the insulating disc 12 to provide indicating positions for assembling the base on or to an electric device.

Fig. 3 is a top view of the base shown in Fig. 2. Rectangular impression 17 is formed by a molding tool in the compression operation (not shown).

Fig. 4 illustrates the metallic shell 11 used as part of base 10 of Fig. 2, and indicates more clearly the deformable inturned flange 15 defining the aperture. For proper molding results as hereinafter explained the angle $a$ of the flange 15 of the metallic shell 11 is critical and should be between 30 to 60 degrees with the vertical axis of shell 11.

Fig. 5 is a bottom view of shell 11 illustrated in Fig. 4 and indicates more clearly a series of indentations 18 which aid in securing the insulating disc 12 to the metallic shell 11 and to prevent rotation of the disc relative to the shell. A single indentation may be used if desired.

In practice, a preferred form of my invention may comprise a metallic shell stamped out of copper, aluminum, iron or combinations thereof. Disc 12 may be a plastic molding compound such as those comprising phenol-furfural resins or phenolic resins or a plastic molding compound comprising a phenol-furfural resin and formaldehyde to which may be added a plasticizer such as dibutyl phthalate, a lubricant such as hexomethylene tetramine, an accelerator such as benzoyl peroxide, and a filler such as wood flour.

Fig. 6 illustrates a side elevation partly in section of an apparatus for molding the insulating disc 12 into shell 11. This apparatus includes a base (not shown) which supports a vertically extending frame 19 provided with a stationary cross-arm 20. A pair of vertically movable cross-arms 21 and 22 are mounted on the frame 19 and are actuated by power-driven equipment (not shown). The length of travel of the cross-arms 21 and 22 are controlled by a pair of push rods 23 and 24.

A mold 25 comprising body portions 26 and 30, and a plunger 27 embodying pins 28, and 29 is mounted on the vertically movable cross-arms 21 and 22. As cross-arm 21 moves vertically upward it engages with body portion 30 of the mold mounted on cross-arm 22. Upon engagement of the body portion 26 with body portion 30, the body portions continue to move vertically upward together for the remainder of the travel stroke. At the end of the travel stroke the molding operation is complete and the vertically movable cross-arms 21 and 22 return to their original positions. As cross-arm 22 returns to its original position a pair of ejector or "knock out" pins 31 and 32 mounted in body portion 30 force base 10 out of that portion of the mold.

Figs. 7, 8, 9, and 10 illustrate in more detail the steps in the method of molding the plastic disc 12 into the metallic shell 11. As illustrated in Fig. 7, the metallic shell 11 is first placed in the mold cavity formed in body portion 26 of the mold 25. The inturned or reentrant flange 15 of shell 11 is thus positioned directly above plunger 27. A predetermined amount of a plastic molding compound 33 is ejected into the body portion 26 directly above and in the cavity formed by the plunger 27. As body portion 26 is moved vertically upward it engages body portion 30 which is so designed to form a "positive" or "closed" mold. As the body portions 26 and 30 engage each other, plunger 27 continues its upward vertical movement until its full pressure is applied to the plastic molding compound.

As indicated in Fig. 9, plunger 27 by means of pressure deforms the inturned or reentrant flange 15 and embeds the end portions of flange 15 within the peripheral edge of disc 12 which is now produced or formed by the application of pressure and heat in mold 25. Disc 12 is deposed within and bridges the aperture of flange 15. For proper molding results the angle of flange 15 of the metallic shell 11 before molding is critical. For best results it should be between 30 to 60 degrees with the vertical axis of shell 11. If other angles outside of this range were used, upon deformation, the inturned flange would be embedded within the peripheral edge of disc 12, but too close to either one of the flat parallel surfaces of the disc. This would result in a variation of the thickness of the plastic on either side of the embedded flange and in turn a variation of the maximum strength in any direction. By using a "positive" or "closed" mold, the plastic composition is submitted to the maximum pressure necessary to develop the full strength of which the plastic is capable of acquiring.

As indicated in Fig. 7, body portion 30 is designed to form a pair of nipples 16 in disc 12 and also designed by means of nipple 34 to provide a vent 35 in the finished form of disc 12 as shown in Figs. 2 and 3. This vent 35 allows gases to escape during the basing operations of electric devices.

As the plunger 27 reaches the end of its stroke, pins 28 and 29 form holes or openings in disc 12 which are designed to later house and support the contact pins 13 and 14 of the finished base. Fig. 10 shows shell 11 with disc 12 deposed within and bridging its aperture formed by flange 15. Contact pins 13 and 14 are illustrated therein to show one means of mechanically assembling the pins to the finished molded product. I have herein indicated one means of securing the contact pins 13 and 14 to the plastic disc 12, however, these pins may also as part of the molding operation be molded into the plastic disc and thus form one integral finished product.

In accordance with my invention, I provide a new and improved base for an electric device possessing strength, flexibility, and rigidity which may be inexpensively manufactured on automatic machinery. Accordingly, I provide a base for an electric device comprising a metallic shell molded and embedded in a plastic disc.

Generally speaking, I effect these desired results by providing a method of disposing an insulating disc within and bridging an aperture formed by a reentrant flange of a metallic shell. Thus, a base structure easy and economical to manufacture is provided.

What I claim as new and desire to secure by Letters Patent of the United States is:

1. A method for constructing a base structure for an electric device comprising a metallic shell providing a reentrant flange defining an aperture and a plastic disc molded within said aperture with the edge portion of said flange embedded in the peripheral edge of said disc, which method comprises shaping a cup-shaped metallic shell to provide a deformable frusto-conical shaped flange defining an aperture and the surface of which lies within a 30 to 60 degree angle of the vertical axis of said shell, inserting plastic molding material within said aperture and compressing said plastic molding material to deform said flange and embed said flange within the peripheral edge of said disc.

2. A method for constructing a base structure for an electric device comprising a metallic shell providing a reentrant flange defining an aperture and a plastic disc molded within said aperture with the edge portion of said flange embedded in the peripheral edge of said disc, which method comprises shaping a cup-shaped metallic shell having an aperture in the bottom wall thereof to provide at the margin of said aperture an outwardly projecting frusto-conical flange portion the surface of which lies within a 30 to 60 degree angle of the vertical axis of said shell, inserting plastic molding material within said aperture and compressing said plastic molding material to deform said flange portion and embed said flange portion within the peripheral edge of said disc.

JOHN F. SCHMERHEIM.

REFERENCES CITED

The following references are of record in the file of this patent:

UNITED STATES PATENTS

| Number | Name | Date |
| --- | --- | --- |
| 2,321,245 | Flaws | Feb. 23, 1943 |
| 2,335,168 | Bingley | Nov. 23, 1943 |
| 2,336,556 | Malloy | Dec. 14, 1943 |
| 2,343,522 | Bergman | Mar. 7, 1944 |
| 2,386,190 | Betts | Oct. 9, 1945 |
| 2,398,595 | Powell et al. | Apr. 16, 1946 |